Jan. 7, 1969 G. KOLOMAYETS ET AL 3,420,533

TONE ARM DRIVE MECHANISM

Filed Oct. 22, 1965 Sheet 1 of 2

INVENTOR.
Allen J. Bury
George Kolomayets
BY
Nicholas D. Lamast
ATTY.

TONE ARM DRIVE MECHANISM

Filed Oct. 22, 1965

INVENTOR.
Allen J. Bury
BY George Kolomayets
Nicholas A. Camasto
ATTY.

United States Patent Office 3,420,533
Patented Jan. 7, 1969

3,420,533

TONE ARM DRIVE MECHANISM

George Kolomayets, Chicago, and Allen J. Bury, Prospect Heights, Ill., assignors to Admiral Corporation, Chicago, Ill., a corporation of Delaware Filed Oct. 22, 1965, Ser. No. 502,132
U.S. Cl. 274—15 7 Claims
Int. Cl. G11b *17/00;* G11b *17/06*

ABSTRACT OF THE DISCLOSURE

A tone arm drive mechanism incorporating a centrally mounted, rigidly connected, tone arm plate having a circular edge frictionally driven by a resilient drive finger torsionally secured to a pivotably movable control plate. The drive finger is carried along an arcuate unobstructed path which intersects the tone arm plate causing the drive finger to frictionally engage the circular edge. The frictional force developed is sufficient to carry the tone arm between its preselected movement limits, beyond which the drive finger slips along the circular edge.

*Disclosure*

This invention relates in general to automatic record changing phonographs and in particular to a drive mechanism for controlling movement of a tone arm during a record changing cycle. More particularly, this invention is concerned with an improved tone arm drive mechanism incorporating a resilient driving finger engageable with the edge surface of a simple driven member secured to the tone arm for transmitting motion thereto during a record changing cycle.

A portion of the record changing cycle of most commercial automatic phonographs includes movement of the tone arm from the end of the record being played to a position of non-interference with the succeeding record to be ejected. Subsequent to the ejection of a record, the tone arm must be returned or indexed to the lead-in grooves corresponding to that record's diameter.

A typical arrangement in many prior art tone arm drive mechanisms was to position a cork or fiber member between a pair of flat metal surfaces. In these drive mechanisms, the metal surfaces were urged together by a spring, camming means, or the like, thus sandwiching the cork or fiber member therebetween. The coefficient of friction between the fiber member and metal surfaces thus allowed the three elements to rotate as a single unit.

This type of tone arm drive mechanism is subject to substantial wear after long periods of operation primarily due to the cork becoming too smooth or the spring losing its resilience. In some instances the cork material became so smooth or the springs so weak that replacement was required. In addition, this type of prior art drive was subject to slippage in the event a lubricant or other foreign material came in contact with the cork material. The presence of these materials in the mechanism of a phonograph and in the area of the tone arm drive created a constant danger of improper record changing operation.

A further problem involved in prior art tone arm drive mechanisms was that of economics. Tolerances were quite critical necessitating more precise, more elaborate, and inherently more expensive machining operations. The number of separate parts required was also greater than in the tone arm drive mechanism to be described.

This invention overcomes many of the objections and deficiencies of prior art tone arm drive mechanisms. A drive mechanism constructed in accordance with the teachings of this invention utilizes a resilient metal drive finger for transmitting motion to an edge surface of a metal tone arm plate coupled directly to the tone arm. This metal-to-metal contact obviates the need for troublesome fiber or cork materials.

The drive finger is secured directly to a segment of a control plate which is driven by a phonograph drive motor through a mutilated gear in a manner well known to those versed in the art.

The primary object of this invention is to provide a simple, economical, and trouble free tone arm drive mechanism for incorporation in an automatic record playing phonograph.

Another object of this invention is to provide a simplified mechanical coupling capable of transmitting positive and lost motion movement between a control plate and a tone arm.

An additional object of this invention is to provide a tone arm drive mechanism which will protect the remainder of the phonograph components in the event tone arm movement is restrained.

A further object of this invention is to provide an easily manufactured tone arm drive mechanism in which tolerances are relatively uncritical and costs are reduced due to the minimization of parts required.

A feature of this invention resides in the elimination of fiber material in a drive mechanism and the substitution therefor of metal-to-metal contact in the form of a resilient drive finger engaging a limited portion of the edge surface of a metal plate.

A primary advantage of this invention resides in a tone arm driving mechanism which is extremely simple and economical to manufacture and assemble and extremely reliable in operation.

Other objects and advantages of this invention will become apparent upon an examination of the following description taken in conjunction with the accompanying drawings wherein.

Figure 1:
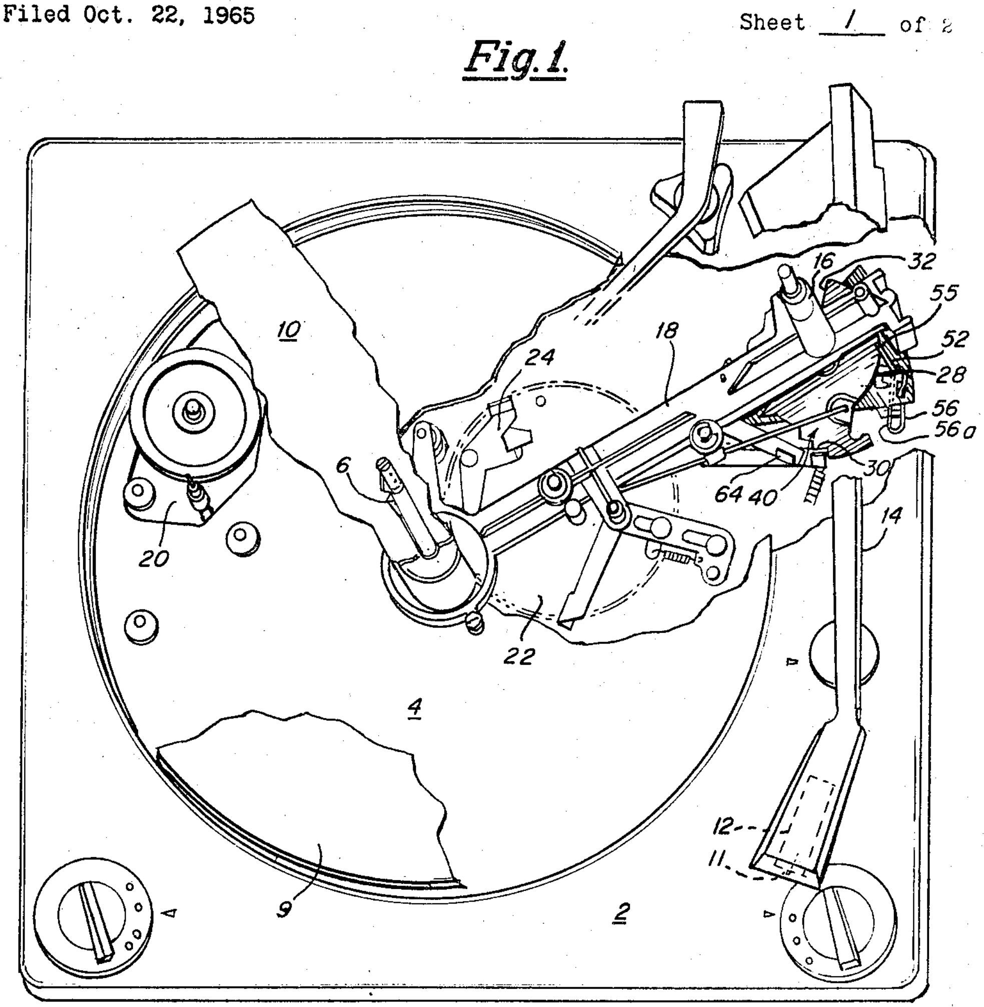
FIG. 1 illustrates a partially cutaway top perspective view of an automatic phonograph in which the present invention is included.
Figure 2:
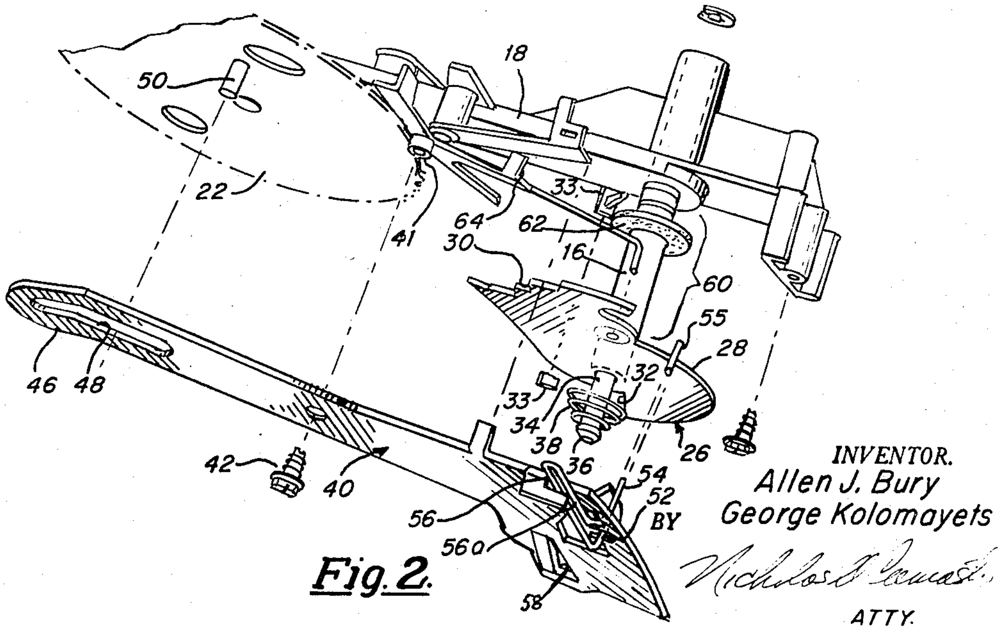
FIG. 2 is an enlarged, exploded, perspective view illustrating some of the more important elements of the tone arm drive mechanism.

The automatic record playing phonograph, as will be particularly noted in FIGS. 1 and 2, comprises a pan 2, the central area of which contains a depressed circular portion 4 through which is mounted a spindle 6 for supporting and ejecting a magazined stack of records. A turntable 9 is mounted on pan 2 for rotation about spindle 6 and carries one or more stacked phonograph records, each having a record playing surface 10. A record pickup stylus 11 and cartridge 12 are secured to an end of a tone arm 14. The opposite end of tone arm 14 is movably mounted above pan 2 on a hollow post 16, which is secured within a supporting structure 18. Supporting structure 18 is in turn fastened to the underside of the pan by suitable means, not shown. The hollow post is rotatable within its supporting structure thus allowing the tone arm to horizontally pivot from the position shown in FIG. 1 to a position shown in FIG. 3 where the cartridge is adjacent the spindle. In addition, the end of the tone arm opposite the cartridge is mounted to allow the tone arm to swing in a vertical plane.

A driving motor 20, suitably mounted under the pan, is drivingly engageable with turntable 9. Through an adequate gearing arrangement, not shown, the turntable provides movement for a mutilated gear 22, rotatably secured to the underside of the depressed circular portion of pan 2. The mutilated gear is driven through one full revolution during a record changing cycle responsive to energization thereof by a velocity trip means 24 well known in the art as shown for example in the Vistain Patent No. 2,983,515, granted June 6, 1961.

As best seen in FIG. 2, a tone arm plate, generally referred to by reference numeral 26, is permanently secured to a lower end of hollow post 16 beneath the underside of pan 2. The tone arm plate is provided with an arcuate edge surface 28, a series of steps 30 for proper tone arm indexing, and a limit 32 co-operable with a stop tab 33 depending from the support structure. The limit and stop tab control maximum tone arm pivotal movement in a direction away from the spindle. A vertical push rod 34 is telescoped within hollow post 16 to control vertical tone arm movement, and vertically remove pickup stylus 11 from the record playing surface prior to initiation of horizontal tone arm movement. The lower terminus of push rod 34 is fitted with a retaining collar 36 for retaining a coil spring 38 in place beneath the tone arm plate.

Control plate 40 is also pivotally secured to support structure 18 at a point 41 intermediate the mutilated gear and the tone arm plate, by a screw 42. One end 46 of the control plate is slotted at 48 to receive a depending stud 50 permanently secured to the underside of mutilated gear 22. The opposite end of control plaate 40 extends beneath and is substantially parallel to tone arm plate 26. This end is provided with an upwardly projecting resilient driving finger 52 of substantially right-angle configuration, having a free end 54, a side portion 55 facing the circular edge, and a supporting base 56.

Free end 54 is of sufficient length (as shown in dashed lines in FIG. 2) to bridge the normal distance between the control plate and tone arm plate and its path of movement is arranged so that upon a predetermined movement of the control plate as provided by mutilated gear 22 during the change cycle, side portion 55 engages circular edge surface 28 of tone arm plate 26. Initial engagement of the side portion with the circular edge is substantially a line contact. Further engagement with the edge causes the finger to bend or flex away from the plate resulting in a point contact therewith. This deflection is primarily absorbed by torsion of a leg 56*a* of the base structure.

Sufficient force is exerted by drive finger 52 on edge surface 28 to carry the tone arm plate (and tone arm) along with the drive finger. Even though the drive finger path diverges from the circular edge, the finger deflects to maintain driving contact therewith. When the tone arm reaches its limit of travel, the drive finger slips along the circular edge. In practice, the circular edge is lubricated to minimize wear on the drive finger and edge combination. The lubricant, of course, lowers the coefficient of friction between the drive finger and circular edge, but sufficient torsional force is exerted by the drive finger resilience to carry the tone arm throughout its operational cycle. The presence of the lubricant does not result in the drive finger slipping under drive conditions, but prevents abrasion during slipping i.e., when the tone arm has reached one of its limits or when the tone arm is arbitrarily stopped in cycle for some reason.

An area of control plate 40 directly beneath the lower terminus of vertical push rod 34 is depressed into a cam surface 58. During normal record playing operation the push rod rests at the lowest point of the cam surface. However, upon commencement of the record changing cycle and movement of the control plate, the push rod is lifted upwardly against the compression of coil spring 38. Upward movement of the push rod provides vertical tone arm movement and lifts the stylus from the record playing surface. As the push rod is elevated, similar movement is imparted to the tone arm plate closing a normally existing gap 60 between it and the bottom of support structure 18. A cork, washer-shaped member 62 is permanently positioned within this gap and is slightly compressed as the tone arm is removed from the record playing surface. The cork washer dampens horizontal tone arm movement thereby preventing damage to the record playing surface and eliminating inaccurate tone arm movement.

The stepped portion 30 opposite circular edge surface 28 of tone arm plate 26 provides proper tone arm setdown or indexing for records having playing surfaces of various diameters. Tone arm setdown may be controlled by either automatic or manual means, depending upon the degree of record changer automation.

Basic operation of the tone arm drive mechanism involves the engagement of side portion 55 of the drive finger with the circular edge surface of tone arm plate 26. This engagement is initiated at the beginning of the record changing cycle as the mutilated gear beings to rotate and the distance between the drive finger and edge surface approaches zero.

*Operational cycle*

Figure 3:
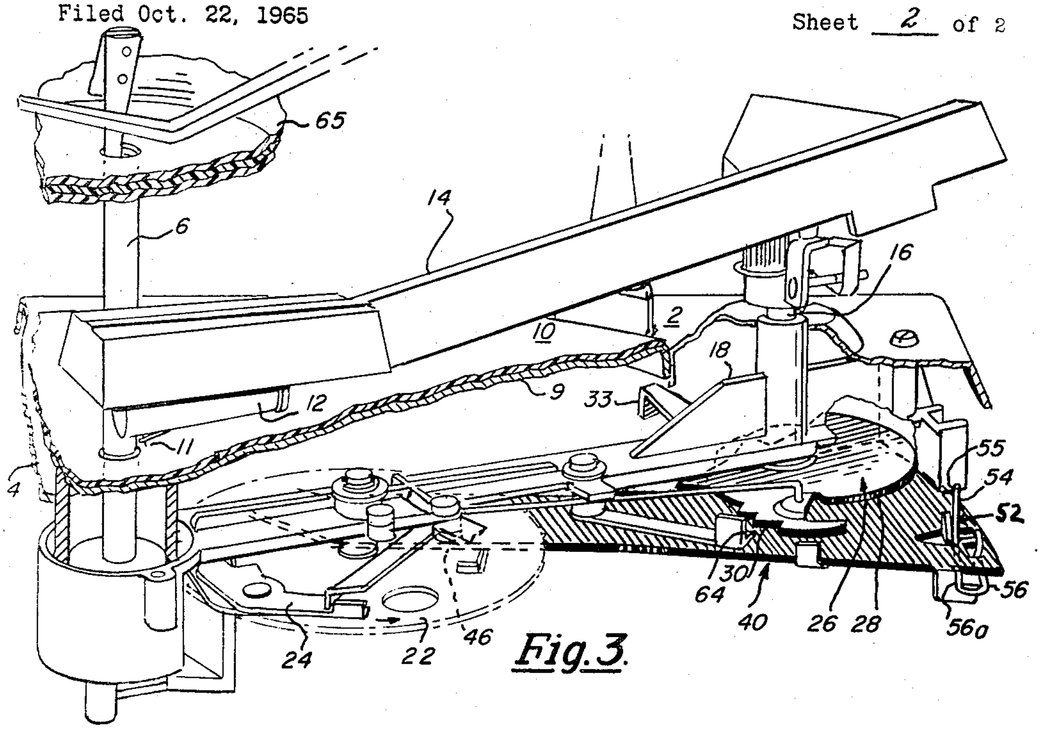
FIG. 3 is a top perspective view particularly illustrating the relative positions of the tone arm plate, control plate, and resilient finger before the latter begins to engage the tone arm plate and before the tone arm begins to swing away from the spindle.

Before the record changing cycle commences, the elements of the tone arm drive mechanism are positioned as shown in FIG. 3 with the tone arm in its closest position toward the spindle, the mutilated gear and control plate in a stationary position and the drive finger disengaged from the circular edge surface of the tone arm plate. When the record changing cycle is initiated by velocity trip means 24 as herein before referred to in the Vistain patent, counter-clockwise rotational motion is imparted to the mutilated gear. Rotation of this gear and depending stud 50 in slot 48 causes the control plate to pivot about point 41. As best seen in FIG. 2, the pivotal motion is clockwise when viewed from below and counter-clockwise when viewed from above. Counter-clockwise rotation of the control plate initiates other consecutive movements in the record changing cycle. First, the vertical push rod resting on surface 58 is slowly lifted imparting similar movement to the tone arm. Second, side portion 55 of the drive finger first approaches, then engages circular edge surface 28 of the tone arm plate in a line contact. Upon engaging the edge surface, the drive finger is deflected from its perpendicular position relative to the control plate thereby changing the line contact to a point contact at an underside corner of the circular edge surface. This deflection, being primarily resisted by the torsional properties of leg 56*a*, provides a positive frictional engagement between the finger and the circular edge surface. It is well to note at this point the safety feature which is provided by this frictional coupling should the tone arm be momentarily held or moved by the user while it is in a change cycle. In such event, the load on the tone arm would exceed the force capabilities of the drive finger and it would merely slip along the circular edge surface. In actual practice, the edge surface is coated with a lubricant, since some slippage between the drive finger and tone arm plate occurs during every change cycle (when the tone arm limit stops are reached).

Figure 4:
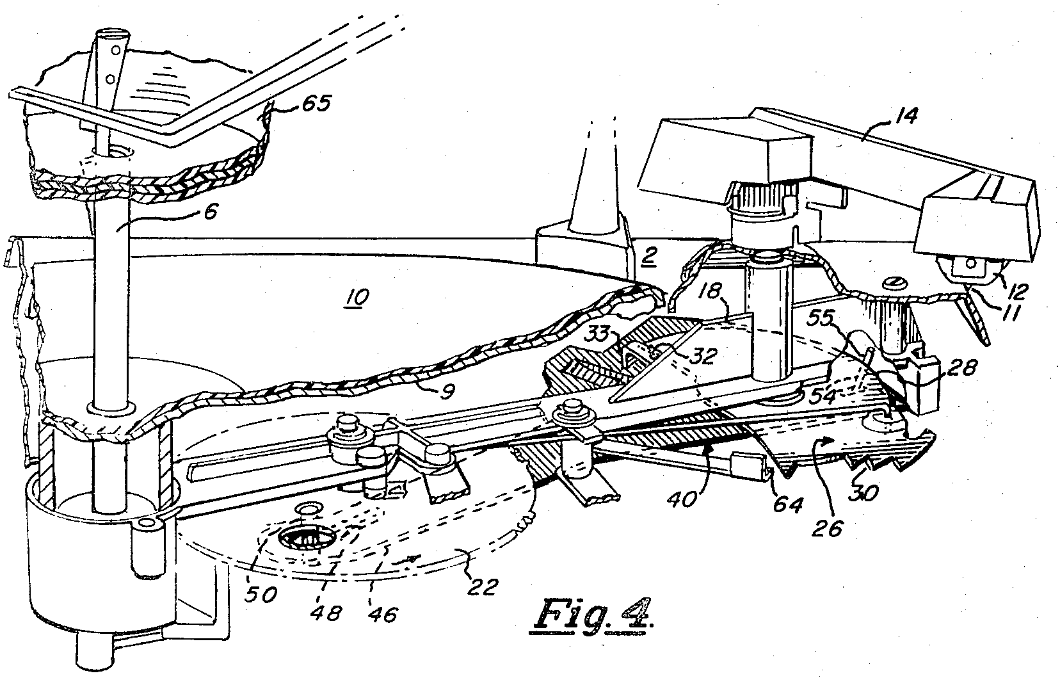
FIG. 4 is a view similar to FIG. 3, but with the elements in a different operating position, namely, the tone arm in its extreme outward position to allow the succeeding record to eject.

Returning to the operational cycle, upon positive contact between the drive finger and tone arm plate, the control plate and tone arm plate pivot as a unitary element. Further rotation of the mutilated gear, control plate, and tone arm plate causes the tone arm to move from its position closest to spindle 6 to an outer position substantially as shown in FIG. 1. This outer position is defined by limit 32 abutting depending stop tab 33, and the configuration of the drive elements during this phase of the change cycle is shown in FIG. 4.

Continued counter-clockwise movement of the control plate with the tone arm plate in an immovable position, due to stop tab 33, forces the drive finger to slide along a corner of circular edge surface 28. Overtravel of the drive finger is intentionally built in to insure that the tone arm plate is always returned to the stop tab 33 at one end and, as will be seen below, always driven into the indexing stop 64 at the other end. This overtravel with subsequent sliding of the drive finger assures alignment of the control plate with the tone arm plate and reduces critical machining and design tolerances heretofore required in many automatic phonographs.

The tone arm is retained in the outer position while further rotation of the mutilated gear allows a record to eject from magazined stack 65 in a manner such as that described in a copending application of the same inventors bearing Ser. No. 474,904, and filed July 26, 1965, now U.S. Patent No. 3,346,261 issued Oct. 10, 1967. The tone arm is now ready to return or index to the outer edge corresponding to the diameter of the record ejected.

Indexing means for controlling tone arm setdown, as hereinbefore explained, may be either automatically controlled for each record by suitable phonograph mechanism or manually set to index a single size record during each ejection. Regardless of whether indexing is automatic or manual, an indexing stop 64 is provided for selective engagement with one of the series of steps 30 on the tone arm plate as it is driven by the drive finger. Indexing stop 64 is positioned (by means not shown) either manually or automatically to selectively engage the steps 30 on the tone arm plate, and thereby terminate its movement. Further rotation of the control plate and drive finger against the now immovable tone arm plate causes the drive finger to slide along the lubricated circular edge surface until it disengages the circular edge surface. Continued rotation of the control plate allows the vertical push rod to return downwardly along the cammed surface 58 under the influence of spring 38, and the tone arm to vertically engage the record playing surface at the position determined by indexing stop 64 and the selected one of steps 30. At this point the record ejection cycle has been completed and the tone arm and stylus operate in a normal record playing manner.

In the invention herein described, all fiber and clutch plates within the tone arm driving mechanism have been eliminated. This reduces manufacturing problems and eliminates several areas of wear and malfunction due to foreign materials. In addition, a reduction in the number of parts reduces the costs of manufacturing.

It is obvious that upon study by those skilled in the art, the invention may be altered or modified both in physical appearance and construction without departing from its inventive concept. Therefore, the scope of protection of this invention should not be limited by the embodiment described above, but should be determined by the essential descriptions thereof.

The embodiments of the invention in which an exclusive property or privilege is claimed are defined as follows:

1. In combination with a drive mechanism for controlling movement of a tone arm of a record changer between a first and a second reference point; tone arm means including a plate having a drive surface and indexing means movable along a predetermined path defined by said reference points; record changer control means including resilient drive means having an unobstructed path of movement extending beyond said reference points and intersecting said predetermined path; and means initiating said record changer control means whereby said resilient drive means frictionally engages a limited portion of said drive surface and conforms to said predetermined path to move said tone arm from said first to said second reference points, said resilient drive means slipping along said drive surface for at least a portion of its movement beyond said reference points.

2. The combination as set forth in claim 1 wherein said drive mechanism also controls movement of said tone arm between said second reference point and a third reference point; said record changer control means reversing the direction of movement of said resilient drive means at a point beyond said second reference point; stop means cooperating with said indexing means to obstruct the return movement of said drive surface at said third reference point; said resilient drive means frictionally engaging said drive surface and again conforming to said predetermined path to move said tone arm from said second to said third reference point whereat said stop means prevents further movement of said drive surface, and said resilient drive means again slips along said drive surface.

3. The combination as set forth in claim 2, including; trip means cooperating with said tone arm and the inner grooves of a record for establishing said first reference point; and set down means including said indexing means said stop means for selectively indexing tone arm movement to establish said third reference point in accordance with record diameter.

4. The combination as set forth in claim 3 wherein said predetermined path is arcuate and wherein said unobstructed path is arcuate, the radius of said predetermined path being substantially smaller than the radius of said unobstructed path.

5. The combination as set forth in claim 4 further including a tone arm plate affixed to said tone arm, said drive surface comprising the edge of said tone arm plate; wherein said resilient drive means comprises a torsionally deformable wire-like drive finger, said edge and said drive finger making a substantially line contact at the intersection points of said predetermined path and said unobstructed path and a substantially point contact at all points between as said drive finger conforms to said predetermined path.

6. In combination with a slip drive mechanism controlling horizontal movement of a tone arm during a record changing cycle in an automatic phonograph; a pan; a spindle secured to the pan including means for supporting and ejecting a stack of phonograph records magazined thereon responsive to initiation of a record changing cycle, each of the phonograph records having a playing surface; a turntable rotatably mounted on said pan coaxial with said spindle and positioned to receive said phonograph records; a vertical shaft pivotably mounted through said pan and having a tone arm secured to the top thereof; said tone arm including cartridge means cooperating with said playing surface; a horizontally disposed tone arm plate including a circular edge surface and a limit stop secured to said shaft below said pan and pivotal with said tone arm; a stop tab secured beneath said pan arranged for cooperation with said limit stop to terminate movement of said tone arm plate; a horizontally disposed control plate mounted for pivotal movement below said pan and vertically spaced a predetermined distance from said tone arm plate; a vertically extending wire-like resilient drive finger having a torsionally deformable leg secured to said control plate, said drive finger having a length greater than said predetermined distance and having an unobstructed arcuate path intersecting said circular edge surface for frictionally driving engagement therewith during a portion of said record changing cycle, said drive finger arranged for a slipping contact along said circular edge surface as said limit stop engages said stop tab.

7. The combination as set forth in claim 6 wherein said horizontal tone arm plate further includes an index stop; tone arm indexing means selectively movable into the path of said index stop for restraining movement of said tone arm plate; means reversing the direction of movement of said control plate during a latter part of said record changing cycle, said wire-like drive finger frictionally engaging said circular edge surface, while moving in the opposite direction, and driving said tone arm plate until said index stop engages said tone arm indexing means, said drive finger thereafter slipping along said circular edge surface during the remainder of its travel.

References Cited

UNITED STATES PATENTS 3,005,636 10/1961 Hansen ------------- 274—10

LEONARD FORMAN, *Primary Examiner.*

F. J. D'AMBROSIO, *Assistant Examiner.*